(12) United States Patent
Eldar et al.

(10) Patent No.: US 10,579,805 B2
(45) Date of Patent: Mar. 3, 2020

(54) ENABLING CLASSIFICATION AND IRM IN SOFTWARE APPLICATIONS

(71) Applicant: Microsoft Israel Research and Development (2002) LTD, Matam Haifa (IL)

(72) Inventors: Yuval Eldar, Shoham (IL); Roee Oz, Tel-Aviv (IL); Slava Reznitsky, Rishon-Lezion (IL)

(73) Assignee: Microsoft Israel Research and Development (2002), Redmond, WA (US)

(*) Notice: Subject to any disclaimer, the term of this patent is extended or adjusted under 35 U.S.C. 154(b) by 0 days.

(21) Appl. No.: 15/519,914

(22) PCT Filed: Oct. 14, 2015

(86) PCT No.: PCT/IL2015/051023
§ 371 (c)(1),
(2) Date: Apr. 18, 2017

(87) PCT Pub. No.: WO2016/063276
PCT Pub. Date: Apr. 28, 2016

(65) Prior Publication Data
US 2017/0337383 A1 Nov. 23, 2017

Related U.S. Application Data

(60) Provisional application No. 62/066,995, filed on Oct. 22, 2014.

(51) Int. Cl.
*G06F 21/60* (2013.01)
*G06F 21/62* (2013.01)
(Continued)

(52) U.S. Cl.
CPC ........ *G06F 21/602* (2013.01); *G06F 9/44521* (2013.01); *G06F 21/10* (2013.01);
(Continued)

(58) Field of Classification Search
CPC ...... G06F 21/602; G06F 21/6281; G06F 8/65; G06F 9/44521; G06F 21/10; G06F 21/54; H04L 2463/101; H04W 12/04
See application file for complete search history.

(56) References Cited

U.S. PATENT DOCUMENTS

2007/0156694 A1  7/2007 Lim
2007/0162749 A1  7/2007 Lim
(Continued)

FOREIGN PATENT DOCUMENTS

JP  2002278938 A  9/2002
JP  2007011511 A  1/2007
(Continued)

OTHER PUBLICATIONS

"Search Report Issued in European Patent Application No. 15852905. 7", dated Apr. 18, 2018, 7 Pages.
(Continued)

*Primary Examiner* — Baotran N To
(74) *Attorney, Agent, or Firm* — Workman Nydegger

(57) ABSTRACT

A method for enabling data classification and or enforcement of Information Rights Management (IRM) capabilities and or encryption in a software application according to which, an agent is installed on each terminal device that runs the application and a central management module which includes the IRM, encryption and classification policy to be enforced, communicates with agents that are installed on each terminal device. The central management module dis-
(Continued)

tributes the appropriate IRM and or classification policy to each agent and applies the policy to any application that runs on the terminal device.

18 Claims, 1 Drawing Sheet

(51) Int. Cl.
*G06F 9/445* (2018.01)
*G06F 21/10* (2013.01)
*G06F 21/54* (2013.01)
*G06F 8/65* (2018.01)
*H04W 12/04* (2009.01)

(52) U.S. Cl.
CPC .......... *G06F 21/54* (2013.01); *G06F 21/6281* (2013.01); *G06F 8/65* (2013.01); *H04L 2463/101* (2013.01); *H04W 12/04* (2013.01)

(56) References Cited

U.S. PATENT DOCUMENTS

| | | |
|---|---|---|
| 2008/0071728 A1 | 3/2008 | Lim |
| 2008/0155702 A1 | 6/2008 | Bala |
| 2009/0300712 A1 | 12/2009 | Kaufmann |
| 2012/0023182 A1 | 1/2012 | Pulfer et al. |
| 2013/0219176 A1* | 8/2013 | Akella ................ H04L 63/0815 713/165 |

FOREIGN PATENT DOCUMENTS

| | | |
|---|---|---|
| JP | 2009266034 A | 11/2009 |
| JP | 2012137973 A | 7/2012 |
| RU | 2524566 C1 | 7/2014 |

OTHER PUBLICATIONS

"International Search Report and the Written Opinion" issued in PCT Application No. PCT/IL2015/051023 dated Jan. 18, 2016.
"Office Action Issued in Russian Patent Application No. 2017113610", dated Apr. 22, 2019, 8 Pages. (W/o English Translation).
"First Office Action and Search Report Issued in Chinese Patent Application No. 201580057591.9", dated Aug. 16, 2019, 25 Pages.
"Office Action Issued in Japanese Patent Application No. 2017-541178", dated May 17, 2019, 8 Pages.

* cited by examiner

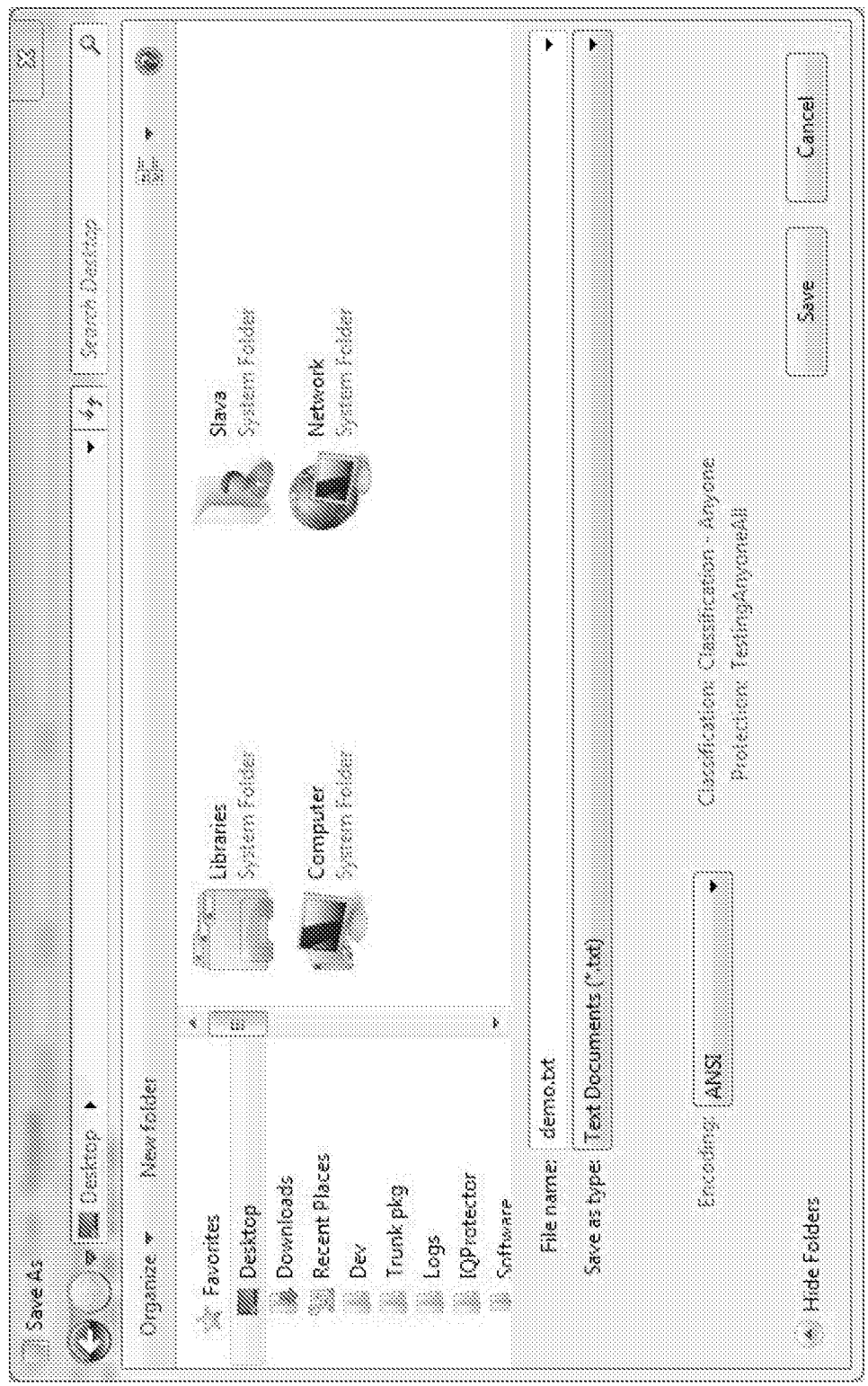

ENABLING CLASSIFICATION AND IRM IN SOFTWARE APPLICATIONS

FIELD OF THE INVENTION

The present invention relates to the field of information technology. More particularly, the invention relates to a method for enabling data classification and enforcement of Information Rights Management (IRM) capabilities in software applications, run by a computer network in a corporate environment.

BACKGROUND OF THE INVENTION

Information Rights Management (IRM) is used in many organizations to protect corporate sensitive information (such as financial data, intellectual property and executive communications) from unauthorized access and usage. IRM mainly includes enforcement of access and usage rights, in order to determine which user will be able to perform actions on data, such as copy, drag/drop, print, print screen, save as, save and view operations. In order to be IRM enabled, each application that consumes encrypted data should be able to receive a decryption key, decrypt the data and to render the decrypted data for allowing access to the user. For this purpose, all the usage rights capabilities should be integrated into the application including encryption/decryption and data exchange with the key management, such that the set of permissions of each data item will be analyzed, in order to enable or disable functionalities within the application and enforce the usage rights. This leads to a situation where IRM implementation strongly dependent of the application type, and therefore, varies from application to application.

One of the existing solutions for implementing IRM to an application is to use an IRM Software Development Kit (SDK—which is a software development tool that allows the creation of applications for a certain software development platform) which is usually provided by the IRM vendor. By doing this, the code for IRM is developed as part of the application's inherent code. However, this solution is cumbersome and costly, since it requires modifications in the inherent code of each application, especially in enterprises that use many applications from many software providers, most of the readymade of the shelf applications. In this case, this solution requires the cooperation of those many different application vendors. Also, sometimes the relationship between the application vendors and the IRM vendors renders the IRM implementation by the 3rd party vendor impossible. In addition, not all IRM vendors provide usable SDK usable in all development technologies, and not all applications vendors will integrate such SDK, while 3rd party modifications of their source or binaries are forbidden by the application vendor licensing.

A similar problem arises when it is required to display, add, and modify the classification of data items by the user via the application that renders the data. Sometimes classification of data is mandatory, due to security reasons. For example, if the data contains sensitive content (e.g., credit card numbers), it must be classified.

One of the main difficulties is the fact that each application has a different UI, different layout of UIs and different technology, which impose usability problems. One of the problems is that it is desired to provide to each user of an application a uniform usability experience, even though the UI layout is different from application to application. One of the conventional solutions to the uniformity problem is to use the SDK for implementing classification capabilities, for example using a toolbar. However, this requires modifying the UI layout in each application to get such uniformity. Another solution is to use an add-on (a piece of software which enhances another software application), but this also requires integrating a different add-on to each application.

Another way to integrate classification capability is to use a generic location, such as the title bar (a graphical control element which is a part of the window decoration—normally located at the top of the window as a horizontal bar). However, there are some applications with no title bar and in any case, using a title bar in the middle to gain classification capability interrupts the user's natural workflow (i.e., the natural sequence which the user performs while using almost any application). For example, in order to save a created data item the user will be required to use the title bar. Similar interruption appears while using popups (which are external to the application) to provide classification capability. It is also possible to use right clicking through a file explorer (such as Windows Explorer) to offer classification capability but this also interrupts the user's natural workflow, as the user should close the application and use a different tool.

It is an object of the present invention to provide a method for enabling data classification and enforcement of Information Rights Management (IRM) capability in software applications, which does not interrupt the user's natural workflow.

It is another object of the present invention to provide a method for enabling data classification and enforcement of Information Rights Management (IRM) capabilities in software applications, which will be generic for all applications.

It is a further object of the present invention to provide a method for enabling data classification and enforcement of Information Rights Management (IRM) capability in software applications, which does not require integration with the specific application, and doesn't require any development effort, tailored to the targeted application.

It is a further object of the present invention to provide a method for allowing a user to enable classification and IRM within its ecosystem without the requirement to upgrade or modify his existing applications (binaries).

Other objects and advantages of the invention will become apparent as the description proceeds.

SUMMARY OF THE INVENTION

The present invention is directed to a method for enabling data classification and/or enforcement of Information Rights Management (IRM) capabilities and/or encryption in a software application. According to the proposed method, an agent is installed on each terminal device that runs the application and a central management module which includes the IRM, encryption and classification policy to be enforced, communicates with agents that are installed on each terminal device. The central management module distributes the appropriate IRM and/or classification policy to each agent and applies the policy to any application that runs on the terminal device.

The agent may be used to enforce usage rights on the terminal device that runs the application by:
  a) upon receiving a data item or a file by the application, using the agent to identify the application and to extract information about the original IRM rights of the file;
  b) injecting by the agent, a dedicated runtime code unit, which does not interrupt the natural operation of the application, into the application's inherent code, for intercepting calls for operations in the application API or in the operating system API regarding activities that are indicative of operations that the user may perform upon accessing the file;

c) before performing the required operation, enhancing the running process to communicate with the agent to receive the permissions for the accessed data item with respect to the accessing user; and d) enabling only operations that comply with the IRM permissions of the rendered content.

Whenever an application opens several files in separate windows in parallel, the agent is allowed to perform correlation between the window and its corresponding file and IRM, in order to determine how to render it, while calculating rights according to the window trait (that may include the window's title or window's content).

The agent may be adapted to enforce data classification on the terminal device that runs the application by upon identifying that the user triggered a "save" or "save-as" operation, by clicking a "save-as" bottom or using a keyboard shortcut, allowing the agent to intervene in the operating system level to display a modified "Save" window (that may be created for example using Subclassing Controls) with classification and IRM related content.

Classification may be performed automatically according to predetermined corporate policy or determined by the user who creates, edits or consumes the data.

The modified window may be adapted to provide recommendations to the user regarding the required classification of the data.

The classification of a file may be inherited each time when saving the file with or without changing the format or the name of the file.

The modified window may be created by adding a sidebar with all the additional classification features to the standard window or by adding a "Next" button which precedes the "Save" button and invites the user to define the appropriate classification.

Upon receiving a non-conclusive result from the correlation, the IRM may be applied with the highest standard for all files that are open by the application. IRM rights may be applied using hooking and overriding standard operating system level functionalities and APIs (such as a standard Windows API triggered by an application level button or a standard clipboard API).

Augmentation may be kept persistent within data items, and augmentations may be inherited into copied or edited versions of augmented data items, by:

a) overriding a standard dialog provided by the operation system; and b) using a kernel module to keep the application operating with a non-augmented version of the file.

A Windows Kernel level module may be used for identifying a transformation of an augmented file by content similarity and replacing the file with a version including the original's augmentations, or adding the augmentations to the target file.

The present invention is also directed to a computer implemented system with data classification and/or enforcement of Information Rights Management (IRM) capabilities and/or encryption in a software application, which comprises:

a) a plurality of terminal devices that run the application, on which an agent is installed;

b) a computer running a central management module which includes the IRM, encryption and classification policy to be enforced, and communicates with agents that are installed on each terminal device, the central management module is adapted to:

b.1) distribute the appropriate IRM and/or classification policy to each agent; and b.2) apply the policy to any application that runs on the terminal device.

BRIEF DESCRIPTION OF THE DRAWINGS

In the drawings:

FIG. 1 shows an example of a "save" interface, with a modified "Save" window with classification related buttons.

DETAILED DESCRIPTION OF PREFERRED EMBODIMENTS

The method for enabling data classification and enforcement of Information Rights Management (IRM) capabilities in software applications included of two parts. The first part is augmenting the data item with additional features. Such features can include encryption of the original content, adding IRM policies, adding classifications and any other functionality enhancement. By doing so, an enhanced copy of the file is created, which holds additional features within its data. In the second part, in case those augmentations aren't supported by the consuming application (like when the application has no support for the encryption or IRM schemes used to augment the file). Since augmentations should be hidden from the application, the present invention proposes a method for enabling those augmentations to still be active and preserved upon application actions.

US 2010/0146600 discloses a system and method for automatic data protection in an organizational computer network, according to which multiple information profiles for classifying data item are defined, as well as rules for protecting data item belonging to a specific information profile. Data items are classified according to the defined information profiles, and a protection method is applied to data items in response to their classification and a defined set of policy rules. Classification of the data item may automatically be updated in response to a change in the content or location of the data item and the applied protection method is automatically preserved and adapted, throughout the lifecycle of the data item, in response to a change in classification or location of the data item, according to the defined rules. Therefore, the method proposed by the present invention may be used to extend the data protection method of US 2010/0146600, in order to integrate and implement IRM policies in additional set of applications, data items formats and data items transformations.

The method proposed by the present invention, suggests augmenting applications by embedding capabilities into the application such that the application will be able to access, edit, create and act upon such augmented file. An example is rendering an encrypted data item by a non-IRM aware $3^{rd}$ party software, while applying IRM usage right over this $3^{rd}$ party software. In addition, the application user interface is augmented with ways to edit and add augmentations to the content. All this is done without modifying the inherent code of the application. By doing so, the ability of the user to view, define or modify classification of data, and the enforcement of data usage rights will be enabled without requiring vendors' cooperation. Instead, such features are added to the application in runtime, and the application binaries are kept as it has been originally created.

The architecture used includes a central management module which includes the IRM and classification policies and communicates with agents that are installed on each terminal device. The central management module distributes the appropriate IRM or classification policies to each agent, which in turn, applies the policy to any defined application that runs on the terminal device.

Enabling IRM Capabilities in Running Applications

A suggested augmentation of the invention is adding IRM capabilities to any format and application. Enforcement of IRM (or usage rights) on a terminal device is done by an agent implementing the invention. Upon receiving a data item such as a file (which is IRM protected) by the application, the agent identifies the application (e.g., according to the process that is created by the running application or according to its digital signature) and extracts information about the original encryption of the file. A dedicated runtime code unit (which does not interrupt the natural operation of the application) is injected by the agent into the application's inherent code, in order to preform hooking for intercepting calls for standard operations in the application's API or in the operating system, such as clipboard activities (in order to identify copying attempts), printer spooling activities (in order to identify printing attempts) and other predetermined activities that are indicative of operations that the user may perform upon accessing the file. Before performing the required operation, the running process communicates with the agent to get the permissions for the accessed data item with respect to the accessing user and enables only operations that comply with the IRM permissions of the rendered content. The permissions and the IRM policy are embedded within the file which is IRM protected. For example, it is possible that user "A" who accesses a file will be able to view it on his terminal device, but will not be allowed to print its content, while another user "B" who accesses the same file via his terminal device will be able to view and print the content.

Some applications (such as Adobe Acrobat Reader) are able to render several documents within a single process simultaneously, while presenting each document in a separate window. In this case, the agent will perform correlation between the accessed files and its corresponding IRM policy and the specific window showing the document, in order to determine how to apply usage rights on that window. This takes into account the window properties, like title, content, parent and child windows, time of creation and so on. In case that the agent can't positively match the document window to a single data item, the IRM with the highest standard will be used for the window from all the documents identified as possible matches for the window content.

For example, upon accessing a text file (which was modified to be encrypted, assigned IRM rights, or applied with other augmentations external to the file content) by Microsoft Notepad text editing application, the agent on the terminal device identifies the file as containing such augmentations. This can be done by a File System Filter Driver which is a part of the agent. If the file is accessed by an application which should have clear-text access to the file (i.e., "Trusted"), it then stalls the open operation of the applications (IRM_MJ_Create in Windows), and supplies the file reference to the agent. The agent then cleans the file from augmentations that are not supported by the application, and in case of encryption, the agent uses the user identity to fetch the appropriate key in order to allow decrypting the file. The cleaned replica is stored in a secured way such that only the specified process can access it. Once this operation is done, the driver reparses the OS call done by Notepad to open the file, silently redirecting the call to the decrypted replica. As so, the application is actually accessing the cleaned file, and is able to use its content. If this user has permissions which only allowing him to view the data, but block printing or copying for example, Notepad is still able to render the content from the decrypted secured copy, so the user will be able to view the content. However, the code injected into Notepad will not allow him to print the file or to copy the content. If this user has no permissions which provide any level of access to the data, Notepad will not be allowed to display the content (as the agent will not decrypt it for him), even if the user will double click on it. The methods to intercept the data item can vary. It can support file access from other mediums, such as a Web browser or other storage and network mediums.

In order not to be application dependent and not to interrupt the natural workflow of the user, the method proposed by the present invention uses hooking and overriding standard operating system level functionalities and APIs (rather than at the application level). For example, a unified print API is provided by the Windows operating system. This API call may be overridden by the code injected by the agent into a $3^{rd}$ party application, as to apply IRM rights and prevent unauthorized printing of content from this application. Another example is the standard "Save As" window is provided by the Windows operating system via the standard Windows API, usually triggered by an application level's "save"/"save as" buttons. This API can be overridden in order to provide user interface upon save, in addition to track format or location transformation of the content. By tracking such transformation, file augmentation can be preserved upon save-as operations.

Another example is a standard clipboard API, like the one provided by Windows, which can be overridden to enforce an IRM right disallowing copy content out of a secured document via the system services, such as clipboard and drag & drop.

When an application opens an IRM protected file, the file usage rights are retrieved. When an action which is covered by an IRM right occurs, the event details are inspected like the application in which the event happened, the title of the Window or an ancestor window in which the event occurred, the process ID, including parent and child process ID which triggered or related to the event. Those details are used to deduce the original file which holds the data which the event requires. Then the rights associated with the file are evaluated to verify if the event should be enabled or blocked.

In addition to IRM rights enforcements, the invention provides methods to keep augmentation persistent within data items, and to inherit augmentations into copied or edited versions of augmented data items, including "logical copies" holding the same data but differ in their binary format. This becomes possible for example by overriding the standard Save-As dialog provided by the operation system. By this, the system can identify to where, and in what format, a copy of the data item is saved, and to copy augmentations from the source file into its copy. Such inheritance of augmentations can be done without interrupting the normal flow of the user, while a kernel module can be used to always keep the application working with a non-augmented version of the file.

In addition, this can be combined with a Windows Kernel level module, identifying a transformation of an augmented file by content similarity, and either replacing the file with a version including the original's augmentations, or adding the augmentations to the save-as target.

Example of Rights Evaluation

Assuming we have a $3^{rd}$ party application which opens a content file for which IRM augmentation preventing the end user from copy content from this file were added. In this case, when a copy operation is tried by the application, either as a response to user input, or programmatically, standard operation system APIs will be called to store content within an operation system provided "clipboard". Such API calls are intercepted by a runtime code module injected by the invention into the 3$^{rd}$ party application. It is then decided whether to allow this action or to block it, all this depend on the principle's right.

In order to decide this, the application's processes information is used, as well as application windows data and/or window titles. Those are used to deduce the original file from which data is copied, and as so to evaluate whether 'copy' right is allowed for that user by the IRM rights policy augmenting the file. For example, in Microsoft's Notepad text editing application, the windows title holds the file name rendered by Notepad. The window title, in combination with keeping track of the files being accessed by Notepad, allowing us to determine what file Notepad currently renders. Once the file is deduced, it augmentations, like IRM rights, can be applied to the running instance of Notepad. By this, application operations controlled by IRM rights and performed by Notepad like Print, Drag, Print-Screen, Save-As, and Save can be enforced according to the augmentations found within the data files consumed by Notepad.

In some cases there is only partial information about the original file location from the event, like a file-name but not the file's full path. If in addition the application opens several files that have the same file-name but different rights, several possible files may be candidates to read augmentations from. This can happen for example, when enforcing IRM rights on Adobe Reader application. Adobe Reader renders the document title within its window title. While this may allow us to deduce the file rendered by Adobe reader, from the set of files accessed by Adobe Reader, by interpreting their respective titles, there can be more than one matching file candidate. In this case the rights of all possible file candidates are evaluated and uses the most restrictive set of rights is used.

Enabling Classification Capabilities

Similarly, classification capabilities may be enabled and used to enforce IRM (or usage rights) on a terminal device by the agent or alternatively operates solely with no additional IRM enforcement. A method of enabling classification is by identifying (by the hooking code injected by the agent to override a standard operating system save API) that an application is showing a save interface, the agent will display a modified "Save" window with classification related buttons, as shown in FIG. 1.

An example of implementation is by injecting a code unit (a DLL and/or a thread) into the application memory space. This allows gaining access into the application address space. In case the dedicated code is injected into the application, it is possible continue by overriding any dynamically linked function (for Example, Windows API function) with our functions. This gives the ability to replace or modify an application behavior and insert the dedicated code in addition to, or instead of the application itself. For example, Windows API hooking may be used for intercepting the creation of instances of the Windows provided standard Save-As dialog box.

Generally, standard windows provided by the operating system will have standard APIs in order to allow adding elements (new UIs) to the window. This is the case for example in the Windows standard "save-as" dialog box. In case when such an interface (to customize the control isn't provided), or when it is too limited to the desired usage, window subclassing can be used to change or add features to the subclassed window. This way, it is possible to force the running application to call a substitute window, which can be reshaped to include all the new classification features.

Classification may be automatic (predetermined according to the corporate policy) using content analysis, context analysis (such as the identity of the user, the application source, Meta data, IP, or any other Meta data that can be analyzed from the data access event or from the computer environment) or determined by the user who in most cases, edits or consumes the data. The system may also use the modified window to provide recommendations to the user regarding the required classification (such as "confidential", "internal", "Human Resources data" "secret" or "top secret").

Upon completing the creation of the content, the user normally saves it by pressing the "Save" button. In this case, the modified window will display the automatic classification to the user or invite him to define or select classification from a list. If classification wasn't automatically set, and is required by the organization policy, the user may be blocked from saving the data item, until selecting an appropriate classification. This way, applications may be augmented by the capability to classify data, to edit data classification and to present it to end users in a completely inherent method.

Another way to modify an application window is to add a sidebar to it, which will be located and adjusted like it is a natural graphic extension of the window. In this case, all the additional classification features will be displayed in the sidebar, without modifying the original UI elements.

Another way to add classification capability to an application window is to replace the "Save" button by a "Next" button, which invites the user to define the appropriate classification. In this case, the "Save" button will be displayed only thereafter, for allowing the user to complete saving the file.

Persistency of File Augmentations

While working with an augmented data item, the item may be modified (saved) by the consuming application. According to the invention, it is important to preserve all augmentations, including the level of encryption and usage rights (derived from the IRM permissions), classification of a file (or another data item) or other metadata, each time when saving the file using the "Save" operation. This is needed since some or all of the data item's augmentations were stripped before giving the application access to the data item, and may be lost upon saving. This can be done by identifying, for example, the path into which a file is saved, and reapplying augmentations.

Also, in some cases the data item may be saved by an application under different names, into different locations and/or in different file formats. This is usually done by using a "save-as" interface. When such an operation occurs, it is required to preserve the original file augmentations. Identifying such transformed instances of the data item is difficult, since the data item may change its format or internal representation upon carrying out the transform ("save-as"), and so it can't be simply identified by its binary content or by its location (path).

A possible implementation of such inheritance process uses the integration with the operation system common "Save-As" dialog box in order to identify a "save-as" operation of the data item into a new name, location and/or format.

An example of the process is when a user first opens a classified and IRM protected PDF file by Adobe Reader, and then perform a "save-as" operation for saving the file as a plain text file, under a different name and in a different location than the original file. Integrating into the "save-as" dialog allows identifying such a "save-as" operation, and applying the classification and IRM data into the saved-as plain text file.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for enabling data classification and/or enforcement of one or more Information Rights Management (IRM) and/or encryption policies on a data item in a software application, comprising:
   a) installing an agent on each terminal device that runs the software application;
   b) providing a central management module which includes the one or more IRM and/or encryption policies to be enforced, and communicates with the agent that is installed on each terminal device;
   c) distributing, by said central management module, the one or more IRM and/or encryption policies to each agent; and in response to an indication of selecting at least one of the one or more IRM and/or encryption policies,
   d) applying said selected at least one policy to the data item in the software application that runs on said terminal device and accesses the data item, wherein the applying said selected at least one policy comprises:
      injecting a runtime code unit corresponding to said selected at least one policy into inherent runtime code of the software application;
      overriding a portion of the inherent runtime code by the injected runtime code unit during runtime of the software application;
      modifying a "save" user interface, for saving the data item at said terminal device, to include an element indicating the selected at least one of the one or more IRM and/or encryption policies; and
      when the data item is saved at said terminal device, augmenting the data item based on said selected at least one policy by the injected runtime code during the runtime of the software application, so that a natural workflow of the software application is not interrupted.

2. The method according to claim 1, wherein the agent enforces usage rights on the terminal device that runs the software application by:
   a) upon receiving the data item by the software application, using said agent to identify the software application and to extract information about the IRM and/or encryption policies;
   b) injecting by said agent, a dedicated runtime code unit, which does not interrupt a natural operation of the software application, into the software application's inherent code, for intercepting calls for operations in an application API or in an operating system API regarding activities that are indicative of operations that the user may perform upon accessing the data item;
   c) before performing a required operation, enhancing a running process to communicate with said agent to receive permissions for the accessed data item with respect to the accessing user; and
   d) enabling only operations that comply with said IRM permissions of the data item.

3. The method according to claim 1, wherein whenever the software application opens several files in separate windows in parallel, allowing the agent to perform correlation between a corresponding window and its corresponding file and IRM, in order to determine how to render it, while calculating rights according to a trait of the corresponding window.

4. The method according to claim 1, wherein the agent enforces data classification on the terminal device that runs the software application by upon identifying that the user triggered a "save" or "save-as" operation, by clicking a "save-as" bottom or using a keyboard shortcut, allowing the agent to intervene in an operating system level to display a modified "Save" window with classification and IRM related content.

5. The method according to claim 4, wherein the modified window is created using Subclassing Controls.

6. The method according to claim 4, wherein the classification is performed automatically according to predetermined corporate policy or determined by the user who creates, edits or consumes the data.

7. The method according to claim 4, wherein the modified window provides recommendations to the user regarding the classification of the data item.

8. The method according to claim 4, wherein the classification of a file is inherited each time when saving said file with or without changing a format or a name of said file.

9. The method according to claim 4, wherein the modified window is created by adding a sidebar with features related to the classification to a standard window.

10. The method according to claim 4, wherein the modified window is created by adding a "Next" button which precedes a "Save" button and invites the user to define an appropriate classification.

11. The method according to claim 1, wherein a trait of a window includes a title of the window or content of the window.

12. The method according to claim 1, further comprising upon receiving a nonconclusive result from a correlation, applying the IRM with a highest standard for all files that are open by the software application.

13. The method according to claim 1, wherein IRM rights are applied using hooking and overriding standard operating system level functionalities and APIs.

14. The method according to claim 13, wherein at least one of the APIs is a standard Windows API, triggered by an application level button or a standard clipboard API.

15. The method according to claim 13, further comprising keeping augmentation persistent within data items, and to inherit augmentations into copied or edited versions of augmented data items, by:
   a) overriding a standard dialog provided by the operation system; and
   b) using a kernel module to keep the software application operating with a non-augmented version of the data item.

16. The method according to claim 15, further comprising:
   a) using a Windows Kernel level module, for identifying a transformation of an augmented data item by content similarity; and
   b) replacing the data item with a version including the augmentations, or adding the augmentations to a target file.

17. A computer implemented system with data classification and/or enforcement of one or more Information Rights Management (IRM) and/or encryption policies on a data item in a software application, comprising:
- a) A plurality of terminal devices that run the software application, on which an agent is installed;
- b) A computer running a central management module which includes the one or more IRM and/or encryption policies to be enforced, and communicates with agents that are installed on each terminal device, said central management module is adapted to:
  - b.1) distribute the one or more IRM and/or encryption policies to each agent; and in response to an indication of selecting at least one of the one or more IRM and/or encryption policies,
  - b.2) apply said selected at least one policy to the data item in the software application that runs on said terminal device and accesses the data item, wherein the applying said selected at least one policy comprises:
    - injecting a runtime code unit corresponding to said selected at least one policy into inherent runtime code of the software application;
    - overriding a portion of the inherent runtime code by the injected runtime code unit during runtime of the software application;
    - modifying a "save" user interface, for saving the data item at said terminal device, to include an element indicating the selected at least one of the one or more IRM and/or encryption policies; and
    - when the data item is saved at said terminal device, augmenting the data item based on said selected at least one policy by the injected runtime code during the runtime of the software application, so that a natural workflow of the software application is not interrupted.

18. A computer program product comprising one or more hardware storage devices having stored thereon computer-executable instructions that are structured such that, when executed by one or more processors of a computing system, cause the computing system to perform a method for enabling data classification and/or enforcement of one or more Information Rights Management (IRM) and/or encryption policies on a data item in a software application, comprising:
- a) installing an agent on each terminal device that runs the software application;
- b) providing a central management module which includes the one or more IRM and/or encryption policies to be enforced, and communicates with the agent that is installed on each terminal device;
- c) distributing, by said central management module, the one or more IRM and/or encryption policies to each agent; and in response to an indication of selecting at least one of the one or more IRM and/or encryption policies,
- d) applying said selected at least one policy to the data item in the software application that runs on said terminal device and accesses the data item, wherein the applying said selected at least one policy comprises:
  - injecting a runtime code unit corresponding to said selected at least one policy into inherent runtime code of the software application;
  - overriding a portion of the inherent runtime code by the injected runtime code unit during runtime of the software application;
  - modifying a "save" user interface, for saving the data item at said terminal device, to include an element indicating the selected at least one of the one or more IRM and/or encryption policies; and
  - when the data item is saved at said terminal device, augmenting the data item based on said selected at least one policy by the injected runtime code during the runtime of the software application, so that a natural workflow of the software application is not interrupted.

* * * * *